United States Patent Office 3,021,367
Patented Feb. 13, 1962

3,021,367
PREPARATION OF CARBOXYLIC ACIDS
Louis Schmerling, Riverside, and Walter G. Toekelt, Downers Grove, Ill., assignors, by mesne assignments, to Universal Oil Products Company, Des Plaines, Ill., a corporation of Delaware
No Drawing. Filed June 2, 1958, Ser. No. 739,002
13 Claims. (Cl. 260—533)

This invention relates to a method for preparing organic compounds of relatively high molecular weight and particularly to a method of preparing relatively high molecular weight organic salts and acids.

More particularly yet the invention is concerned with the preparation of alkali metal salts and alkaline earth metal salts of relatively high molecular weight organic compounds and also the preparation of their corresponding acids.

Relatively high molecular weight organic acids or the alkali metal salts and alkaline earth metal salts thereof find many uses in the chemical field. For example, the higher molecular weight organic acids are used as intermediates in the preparation of esters which in turn are used in the preparation of artificial perfumes and flavors. Furthermore, certain esters may also be used as solvents, especially in the manufacture of quick drying paints and lacquers. In addition the alkali metal salts of the higher molecular weight polycarboxylic acids may be used in the preparation of soaps and cleansing agents.

It is therefore an object of this invention to provide a method for the preparation of alkali metal and alkaline earth metal salts of higher molecular weight organic acids.

A further object of this invention is to provide a method for the preparation of alkali metal and alkaline earth metal salts of both higher molecular weight mono- and polycarboxylic acids and also a method of preparing the acids themselves.

One embodiment of this invention is found in a process for the preparation of a salt of a higher molecular weight organic acid which comprises reacting an olefin with a compound selected from the group consisting of alkali metal salts of saturated carboxylic acids and alkaline earth metal salts of saturated carboxylic acids, said acids being characterized by the presence of at least one hydrogen atom on an α-carbon atom, in the presence of a catalyst selected from the group consisting of alkali metals, hydrides and amides thereof, hydrolyzing the resultant product, and recovering the desired salt of a higher molecular weight organic acid.

A further embodiment of the invention resides in a process for the preparation of a salt of a higher molecular weight organic acid which comprises reacting an olefin with a sodium salt of a saturated carboxylic acid, containing at least one hydrogen atom on an α-carbon atom, in the presence of a catalyst selected from the group consisting of alkali metals, hydrides and amides thereof and an inert organic diluent at a temperature in the range of from about 50° to about 300° C., hydrolyzing the resultant product, and recovering the desired salt of a higher molecular weight organic acid.

A specific embodiment of the invention resides in a process for the preparation of a salt of a higher molecular weight organic acid which comprises reacting ethylene with sodium acetate in the presence of sodamide and n-heptane at a temperature in the range of from about 150° to about 250° C., hydrolyzing the resultant product, and recovering the desired sodium 2,2-diethylbutyrate.

Yet another embodiment of the invention resides in a process for the preparation of a higher molecular weight organic acid by reacting an olefin with a compound selected from the group consisting of alkali metal salts of saturated carboxylic acids and alkaline earth metal salts of saturated carboxylic acids, said acids being characterized by the presence of at least one hydrogen atom on an α-carbon atom, in the presence of a catalyst selected from the group consisting of alkali metals, hydrides and amides thereof at a temperature in the range of from about 50° to about 300° C., hydrolyzing the resultant product to form the salt of a higher molecular weight organic acid, thereafter acidifying the product, and recovering the desired higher molecular weight organic acid.

Another specific embodiment of the invention is found in a process for the preparation of a higher molecular weight organic acid which comprises reacting ethylene with potassium acetate in the presence of sodamide and n-heptane at a temperature in the range of from about 150° to about 250° C., hydrolyzing the resultant product to form potassium 2,2-diethylbutyrate, thereafter acidifying the last named compound, and recovering the desired 2,2-diethylbutyric acid.

Other objects and embodiments referring to alternative alkali metal salts of saturated carboxylic acids, alkaline earth metal salts of saturated carboxylic acids, olefins, catalysts and diluents will be found in the following further detailed description of the invention.

As hereinbefore set forth this invention is concerned with the preparation of alkali metal salts and alkaline earth metal salts of relatively high molecular weight organic acids and also to the preparation of these acids themselves. These compounds are prepared by reacting an olefin with either an alkali metal salt of a saturated carboxylic acid or an alkaline earth metal salt of a saturated carboxylic acid, said acids being characterized by the presence of at least one hydrogen atom on an α-carbon atom, in the presence of certain catalysts hereinafter set forth. The olefins which may be used in the process of this invention include alkenes, cycloalkenes, alkadienes, cycloalkadienes and polyenes. The alkenes include straight and branched chain alkenes such as ethylene, propylene, 1-butene, 1-pentene, 2-pentene, 2-methyl-1-butene, 1-hexene, 2-hexene, 3-hexene, 2-methyl-1-pentene, 3-methyl-1-pentene, 1-heptene, 2-heptene, 3-heptene, 2-methyl-1-hexene, 3-methyl-1-hexene, 2,3-dimethyl-1-hexene, the straight and branched chain 1-octenes, 1-nonenes, 1-decenes, etc. It is also contemplated within the scope of this invention that cyclic olefins such as cyclopentene, cyclohexene, cycloheptene, etc., and diolefins such as butadiene, isoprene, etc., may also be used although not necessarily with equivalent results. In general the preferred alkenes are the straight chain 1-alkenes of which ethylene is the preferred species.

The alkali metal salts or alkaline earth metal salts of saturated carboxylic acids which may be reacted with the olefinic compound hereinbefore set forth include those acids containing at least one hydrogen atom on a carbon atom alpha to a carboxy group, such a carbon atom being referred to as an α-carbon atom for the purposes of this specification and claims. Generic formulae which may be used to describe these acids are as follows:

RR′CHCOOM and MOOCCHR(CR′R″)$_n$COOM and (RR′CHCOO)$_2$M′ and [OOCCHR(CR′R″)$_n$COO]$_2$M′ in which R, R′ and R″ are independently selected from the group consisting of hydrogen, alkyl, cycloalkyl and aryl radicals, M is an alkali metal, M′ is an alkaline earth metal and $n$ is an integer of from 0 to about 10. Alkali metal salts or alkaline earth metal salts of acids falling within these generic formulae include sodium acetate, potassium acetate, lithium acetate, cesium acetate, rubidium acetate, calcium acetate, magnesium acetate, barium acetate, strontium acetate, sodium propionate, potassium propionate, lithium propionate, cesium propionate, rubidium propionate, calcium propionate, magnesium propionate, barium propionate, strontium propionate, sodium butyrate, potassium butyrate, lithium butyrate, cesium butyrate, rubidium butyrate, calcium butyrate, magnesium butyrate, barium butyrate, strontium butyrate, the aforementioned alkali metal and alkaline earth metal salts of valerates, hexanoates, heptanoates, octanoates, etc.; sodium cyclohexanecarboxylate, potassium cyclohexanecarboxylate, lithium cyclohexanecarboxylate, cesium cyclohexanecarboxylate, magnesium cyclohexanecarboxylate, calcium cyclohexanecarboxylate, barium cyclohexanecarboxylate, strontium cyclohexanecarboxylate, sodium cyclohexylacetate, potassium cyclohexylacetate, lithium cyclohexylacetate, cesium cyclohexylacetate, magnesium cyclohexylacetate, calcium cyclohexylacetate, barium cyclohexylacetate, strontium cyclohexylacetate, sodium phenylacetate, potassium phenylacetate, lithium phenylacetate, rubidium phenylacetate, cesium phenylacetate, calcium phenylacetate, magnesium phenylacetate, barium phenylacetate, strontium phenylacetate, sodium 1- or 2-phenylpropionate, potassium 1- or 2-phenylpropionate, lithium 1- or 2-phenylpropionate, rubidium 1- or 2-phenylpropionate, cesium 1- or 2-phenylpropionate, calcium 1- or 2-phenylpropionate, magnesium 1- or 2-phenylpropionate, barium 1- or 2-phenylpropionate, strontium 1- or 2-phenylpropionate, the aforementioned alkali metal and alkaline earth metal salts of the phenylbutyrates, phenylvalerates, phenylhexanoates, etc.; sodium malonate, potassium malonate, lithium malonate, cesium malonate, rubidium malonate, calcium malonate, barium malonate, strontium malonate, sodium succinate, potassium succinate, lithium succinate, rubidium succinate, cesium succinate, calcium succinate, magnesium succinate, barium succinate, strontium succinate, sodium glutarate, potassium glutarate, lithium glutarate, rubidium glutarate, cesium glutarate, barium glutarate, calcium glutarate, strontium glutarate, the aforementioned alkali metal and alkaline earth metal adipates, pimelates, suberates, sebacates, etc. For purposes of this invention the aryl substituted acids such as phenylacetic acid, 1- and 2-phenylpropionic acid, etc., are considered as falling within the term "saturated carboxylic acids." Due to the relatively greater availability and relatively lower cost as well as the greater yields which are obtained thereby the sodium and potassium salts of the aforementioned saturated carboxylic acids are the preferred reactants of the present process.

Catalysts which are employed in the present process comprise the alkali metals, hydrides and amides thereof, such catalysts including sodium, sodium hydride, sodamide, potassium, potassium hydride, potassium amide, lithium, lithium hydride, lithium amide, rubidium hydride, rubidium amide, cesium, cesium hydride, cesium amide, etc. Mixed hydrides such as lithium aluminum hydride and sodium borohydride may also be used. The catalysts may also comprise an α-alkali metal derivative of an alkali metal salt of a saturated carboxylic acid or a mixture of the derivative and one of the catalysts hereinbefore set forth. It is also contemplated within the scope of this invention that the alkali metal plus a promoter such as an aromatic hydrocarbon including benzene, toluene, anthracene, etc., or an organic halide such as chlorobenzene, etc., or the alkali metal alkyl or aryl such as pentylsodium or phenylpotassium, etc., may be used as catalysts for the present invention although not necessarily with equivalent results.

In addition, if so desired, the reaction may be effected in the presence of a substantially inert organic diluent such as saturated aliphatic hydrocarbons including pentane, hexane, heptane, octane, etc.; cyclic and alkyl substituted cyclic hydrocarbons such as cyclopentane, cyclohexane, cycloheptane, etc., methylcyclopentane, methylcyclohexane, methylcycloheptane, etc.; aromatic hydrocarbons such as benzene, toluene, o-, m- and p-xylene, ethylbenzene, etc., may also be used but are usually less preferable inasmuch as they may not be completely inert under the reaction conditions. Tertiary alkyl and aryl amines such as tributylamine and N,N-dimethylaniline may also be employed as diluents as may alkyl and polyalkyl ethers such as dibutyl ether, bis-(ethoxyethyl) ether, etc.

Generally speaking the reaction between the alkali metal salt of a saturated carboxylic acid or the alkaline earth metal salt of a saturated carboxylic acid, said acids being characterized by the presence of at least one hydrogen atom on an α-carbon atom, and an olefin, in the presence of a catalyst of the type hereinbefore set forth, is effected at a temperature in the range of from about 50° to about 300° C., and preferably at a temperature in the range of from about 150° to about 250° C., the particular temperature being dependent upon the reactants and the catalyst which are used. In addition the reaction will proceed at an elevated pressure, usually in the range of from about 25 to about 200 atmospheres or more. This pressure will generally be supplied by the olefin, if in gaseous form. However, it is also contemplated within the scope of this invention that the pressure may also be supplied by the addition of an inert gas. In each case, however, the pressure will be sufficient to maintain a substantial portion of the reactants in liquid form.

The process of this invention may be effected in any suitable manner and may comprise either a batch or a continuous type operation. For example, when a batch type operation is used a quantity of the alkali metal salt of a saturated carboxylic acid or the alkaline earth metal salt of a saturated carboxylic acid along with the catalyst and the olefin if in liquid form, and the diluent or solvent, if any is used, is sealed in a suitable apparatus such as, for example, a rotating autoclave. If the olefin is in gaseous form, it is pressed in, until the desired pressure has been reached, after the autoclave is sealed. The reaction vessel is heated to the desired temperature and maintained thereat for a predetermined period of time after which the autoclave and contents thereof are cooled to room temperature, the excess pressure is vented and the reaction product is recovered by conventional means such as, for example, by dissolving the reaction product in water to hydrolyze said product thereby forming the desired salt of a higher molecular weight organic acid. The aqueous solution may then be extracted with a suitable organic solvent such as ether to separate the diluent and to remove traces of water-insoluble material after which the aqueous solution is concentrated and the desired salt is separated by fractional crystallization. If, as is usually the case, the higher weight molecular acid itself is desired, the aqueous solution is acidified by conventional means using acidifying agents such as inorganic acids, including hydrochloric acid, sulfuric acid, nitric acid, etc., and recovered by crystallization, one method consisting of extraction of the acid with a solvent such as ethyl ether, followed by fractionation of the extract.

The reaction process of the present invention may also be effected in a continuous type manner. In this type of operation the starting materials comprising the alkali metal or alkaline earth metal salt of a saturated carboxylic acid and the olefin are continuously charged to a reaction zone which is maintained at the proper operating conditions of temperature and pressure and which contains the desired catalyst such as the alkali metal or amide or hydride thereof. The salt of the saturated carboxylic acid and the olefin, in either liquid or gaseous form, are charged to the reactor through separate lines or, if so desired, may be admixed prior to entry into said reactor and charged thereto in a single stream. Likewise, the solvent or diluent, if one is used, is also continuously charged to the reactor through separate means or, may be admixed with one or the other of the starting materials and charged thereto in a single stream. The reaction zone may comprise an unpacked vessel or coil or may be lined with an adsorbent packing material such as alumina, dehydrated bauxite, fire brick and the like. After a predetermined residence time has elapsed the reaction product is continuously withdrawn from the reactor and separated from diluent and unreacted olefin by conventional means. The unreacted starting materials are recycled to form a portion of the feed stock while the reaction product is then continuously charged to a second reaction zone where said product undergoes hydrolysis by treatment with water which is also being continuously charged to said second reactor. The resulting product is then continuously withdrawn from the second reaction zone and the desired salt of the higher molecular weight organic acid is then separated by conventional means and recovered. If the higher molecular weight organic acid itself is desired, the aforesaid product from the second reaction zone is then continuously charged to yet a third reaction zone where it is acidified by the addition of an acid of the type hereinbefore set forth. The product is continuously withdrawn from this third reaction zone and the higher molecular weight organic acid is recovered by conventional means, such as, for example, fractional distillation, fractional crystallization, etc. Alternatively, the hydrolysis and acidification can be carried out simultaneously in the second zone.

The following examples are given to illustrate the process of the present invention, which, however, are not intended to limit the generally broad scope of the present invention in strict accordance therewith.

*Example I*

A mixture of 30 g. of sodium acetate, 10 g. of sodamide and 50 g. of n-heptane was placed in a glass liner of a rotating autoclave having a capacity of 850 cc. The liner was sealed into the autoclave and ethylene pressed in until an initial pressure of 53 atmospheres had been reached. The autoclave and contents thereof were then slowly heated to a temperature of about 250° C. during a period of about 6.5 hours. During this time the maximum pressure in the autoclave rose to 214 atmospheres. At the end of the aforementioned period of time the autoclave and contents thereof were cooled to room temperature, the excess pressure was vented, the autoclave was opened and 49 g. of product inside the liner and 16 g. of product outside the liner was recovered. The product was combined, treated with water and extracted with ether to remove the water-insoluble material present. The aqueous solution consisted of a mixture of dissolved unreacted sodium acetate, sodium 2-ethylbutyrate and sodium 2,2-diethylbutyrate, which may be recovered by fractional crystallization. Preferably however, the aqueous solution was acidified using hydrochloric acid as the acidifying agent. The thus liberated carboxylic acids were extracted with ether, and the extract subjected to fractional distillation under reduced pressure. The cuts boiling in the range of from about 80°–81° C. at 0.9 mm. pressure were separated therefrom. These cuts, which crystallized on standing (M.P., 36–37° C.) comprised 9 g. of 2,2-diethylbutyric acid.

*Example II*

Thirty grams of potassium acetate along with 10 g. of sodamide and 50 g. of n-heptane were placed in a glass liner of a rotating autoclave having a capacity of 850 cc. The liner was sealed into the autoclave and ethylene pressed in until an initial pressure of 53 atmospheres had been reached. The autoclave and contents thereof were slowly heated to a temperature of about 250° C. during a period of about 6 hours, the maximum pressure at this time being 200 atmospheres. At the end of the six hour period the autoclave and contents thereof were cooled to room temperature, the final pressure at room temperature being 45 atmospheres. The excess pressure was vented and the reaction product comprising 87 g. inside the liner and 12 g. outside the liner were combined and treated with water. The water solution was extracted with ether to remove water-insoluble material after which the dissolved potassium acetate, potassium 2-ethylbutyrate and potassium 2,2-diethylbutyrate could be separated and recovered by fractional crystallization.

Preferably, however, solution containing the potassium acetate, potassium 2-ethylbutyrate and potassium 2,2-diethylbutyrate was acidified using hydrochloric acid as the acidifying agent. The carboxylic acids were extracted with ether and the ether extract subjected to fractional distillation under reduced pressure. There was obtained about 9 g. of 2-ethylbutyric acid boiling at 92° C. at 13 mm. pressure and 6 g. of 2,2-diethylbutyric acid boiling at 78–82° C. at 0.8 mm.

*Example III*

In this experiment the reaction was performed in the absence of a diluent. Thirty grams of potassium acetate and 10 g. of sodamide were sealed in the glass liner of a rotating autoclave. Ethylene was pressed in until an initial pressure of 54 atmospheres was reached. The autoclave and contents thereof were then heated to a temperature of 250° C. during a period of about 6 hours, the maximum pressure during the reaction rising to 183 atmospheres. At the end of this time the autoclave and contents thereof were cooled to room temperature, the final pressure at room temperature being 50 atmospheres. The excess pressure was vented and the reaction product comprising 53 g. inside the liner was recovered, treated with water and the aqueous solution containing unreacted potassium acetate, potassium 2-ethylbutyrate and potassium 2,2-diethylbutyrate was then extracted with ether to remove water-insoluble material. The carboxylic acids were then liberated by acidifying the aqueous solution with hydrochloric acid, the product was extracted with ether and the ether extract was subjected to fractional distillation under reduced pressure. Eleven grams of 2,2-diethylbutyric acid was separated and recovered together with about 8 g. of 2-ethylbutyric acid.

*Example IV*

A mixture of 30 g. of sodium propionate and 10 g. of sodamide were placed in the glass liner of a rotating autoclave. The autoclave was sealed and ethylene pressed in until an initial pressure of 54 atmospheres was reached. The autoclave was then heated to a temperature of 250° C. and maintained thereat for a period of about 5 hours during which time the maximum pressure reached 171 atmospheres. At the end of this period of time the autoclave and contents thereof were cooled to room temperature, the final pressure at room temperature being 54 atmospheres. Fifty-seven grams of product inside the liner was recovered, treated with water and extracted with ether to remove water-insoluble material. The aqueous solution containing unreacted sodium propionate, sodium 2-ethylpropionate and sodium 2,2-diethylpropionate may then be subjected to fractional crystallization to separate the desired salts.

Preferably the aqueous solution was acidified using hydrochloric acid as the acidifying agent. The liberated carboxylic acids were extracted with ether and subjected to fractional distillation under reduced pressure to recover the desired product. The cuts boiling at 64°–66° C. at 0.7 mm. pressure were separated, 28 g. of 2,2-diethylpropionic acid being recovered therefrom.

*Example V*

A mixture of 30 g. of sodium acetate, 10 g. of potassium amide and 50 g. of cyclohexane are placed in a glass liner of a rotating autoclave which is thereafter sealed. 1-butene is pressed in until an initial pressure of approximately 50 atmospheres is reached after which the autoclave is heated to a temperature of about 250° C. for approximately 6 hours. At the end of the desired reaction time the autoclave and contents thereof are cooled to room temperature, the excess pressure is vented and the reaction product is treated in analogous manner to the treatment of the product of Examples I and II to recover sodium hexanoate, sodium 2-butylhexanoate and sodium 2,2-dibutylhexanoate or the corresponding hexanoic acid (or, caproic acid), 2-butylhexanoic acid, and 2,2-dibutylhexanoic acid.

Example VI

A mixture of 30 g. of potassium acetate and 10 g. of a 53.6% dispersion of sodium hydride in mineral oil was placed in a glass liner of a rotating autoclave. The liner was sealed into the autoclave and ethylene was pressed in until an initial pressure of 50 atmospheres had been reached. The autoclave and contents thereof were then slowly heated to a temperature of about 250° C. during a period of about 6 hours. During this time the maximum pressure in the autoclave rose to 103 atmospheres. At the end of the aforementioned period of time the autoclave and contents thereof were cooled to room temperature, the final pressure at room temperature being 33 atmospheres. The excess pressure was vented, the autoclave was opened and 56 g. of product inside the liner was recovered. The product was treated with water and extracted with ether to remove the water-insoluble material present. The aqueous solution consisted of a mixture of dissolved unreacted potassium acetate, potassium 2-ethylbutyrate and potassium 2,2-diethylbutyrate, which may be recovered by fractional crystallization. Preferably, however, the aqueous solution was acidified using hydrochloric acid as the acidifying agent. The thus liberated carboxylic acids were extracted with ether and the extract subjected to fractional distillation under reduced pressure. 2-ethylbutyric acid (7 g., 20% yield) boiling at 65–75° C. at 1.2 mm. was separated. There was also obtained product boiling in the range of from 85–88° C. at 1.2 mm. pressure, which crystallized upon standing and comprised 15 g. (34% yield) of 2,2-diethylbutyric acid.

Example VII

A mixture of 60 g. of sodium stearate and 10 g. of sodamide was placed in the glass liner of a rotating autoclave. The liner was sealed into the autoclave and ethylene pressed in until an initial pressure of 65 atmospheres had been reached. The autoclave was then slowly heated to a temperature of 250° C. during a period of 4.5 hours. During this time the maximum pressure rose to 235 atmospheres. At the end of the aforesaid period of time the autoclave and contents thereof were cooled to room temperature, the final pressure at room temperature being 71 atmospheres. The excess pressure was vented and the reaction product comprising 83 g. of a gray, fused solid, was recovered. A 44 g. portion was treated with 200 g. of glacial acetic acid. The solid was dissolved with difficulty and therefore the mixture was heated to hasten the process. The acetic acid solution was diluted with water and extracted with ether. This extract was then washed with water and subjected to fractional distillation under reduced pressure. The cuts boiling at 198–200° C. at 0.7 mm. pressure (and melting at 38–40° C.) were recovered, there being obtained about 12 g. of 2,2-diethylstearic acid along with a smaller portion of 2-ethylstearic acid.

Example VIII

In this experiment a mixture of 30 g. of sodium laurate and 10 g. of sodamide was placed in the glass liner of a rotating autoclave. The liner was sealed into said autoclave and ethylene pressed in until an initial pressure of 50 atmospheres had been reached. The autoclave was slowly heated to a temperature of about 250° C. during a period of 4.5 hours during which time the maximum pressure rose to 109 atmospheres. At the end of this time the autoclave and contents thereof were cooled to room temperature, the final pressure at room temperature being 50 atmospheres. The excess pressure was vented, the autoclave was opened and 50 g. of product inside the liner were recovered. The reaction product was treated with water and then extracted with ether to remove water-insoluble material. Anhydrous potassium carbonate was added to the ether extract whereupon a lower, aqueous layer separated. The aqueous layer from the ether extract was acidified with hydrochloric acid and reextracted with more ether. The ether extract of the alkaline solution was distilled after which the solid bottoms from said distillation were dissolved in water, acidified with hydrochloric acid, extracted with ether and the ether extract subjected to fractional distillation under reduced pressure. The cut (about 18 g., 52% yield) boiling at 158–159° C. at 0.9 mm. pressure comprising 2,2-diethyllauric acid was separated and recovered.

Example IX

A mixture of 50 g. of sodium phenylacetate and 10 g. of sodamide was placed in the glass liner of a rotating autoclave which was thereafter sealed into said autoclave. Ethylene was charged to the autoclave until an initial pressure of 52 atmospheres had been reached. The autoclave was then slowly heated to a temperature of about 250° C. during a period of 6 hours. At the end of this time the autoclave and contents thereof were cooled to room temperature, the excess pressure was vented and 61 g. of product inside the liner were recovered. The product was dissolved in water and steam distilled. Thirteen grams of upper layer of product was recovered which was then redistilled at atmospheric pressure and found to consist largely of toluene and n-propylbenzene. The residue from the steam distillation was acidified with hydrochloric acid, extracted with ether and the extract subjected to fractional distillation under reduced pressure. The cut boiling in the range of 112–113° C. at 0.8 mm. pressure was recovered. This cut comprised 8 g. of 2-ethylphenylacetic acid having a boiling point of 270–271° C. and a melting point of 42° C.

Example X

In this experiment 30 g. of potassium acetate, 10 g. of sodamide and 50 g. of tributylamine were placed in the glass liner of a rotating autoclave. The liner was sealed into the autoclave and ethylene pressed in until an initial pressure of 48 atmospheres had been reached. The autoclave was slowly heated to a temperature of 250° C. during a period of 4.5 hours, the maximum pressure during this time reaching 94 atmospheres. At the end of the aforementioned period of time the autoclave and contents thereof were cooled to room temperature, the final pressure at room temperature being 44 atmospheres. The excess pressure was vented, the autoclave was opened and 98 g. of product inside the liner was recovered. The product was treated with water and extracted with ether to remove water-insoluble material. The aqueous solution containing unreacted potassium acetate, potassium 2-ethylbutyrate and potassium 2,2-diethylbutyrate was then acidified with hydrochloric acid, extracted with ether and the extract subjected to fractional distillation under reduced pressure. The cut boiling at 91–97° C. at 2.2 mm. pressure comprising 9 g. of 2,2-diethylbutyric acid was separated and recovered.

Example XI

In this experiment 30 g. of sodium acetate, 5 g. of sodium and 1 g. of anthracene were placed in the glass liner of a rotating autoclave and treated in a manner similar to that set forth in the preceding examples, that is, ethylene being pressed in and the autoclave being heated at a temperature of about 250° C. The resulting product was also treated in a similar manner and 2,2-diethylbutyric acid was recovered therefrom.

Example XII

A mixture of 30 g. of potassium acetate and 10 g. of sodamide was placed in the glass liner of a rotating autoclave. The glass liner was sealed into the autoclave and 70 g. of 1,3-butadiene charged thereto, the initial pressure being 5 atmospheres. The autoclave was heated to a temperature of 250° C. during a period of 4.5 hours, the maximum pressure reaching 20 atmospheres. At the end of this time the autoclave and contents thereof were cooled to room temperature, the final pressure at room temperature being 5 atmospheres. The excess pressure was vented and the recovered product was dissolved in water yielding an aqueous solution and an upper layer, which were steam-distilled. The aqueous residue was then acidified with hydrochloric acid, extracted with ether and the ether solution was subjected to fractional distillation under reduced pressure. The cut boiling at 77–78° C. at 1.4 mm. pressure comprising a hexanoic acid was separated and recovered.

*Example XIII*

A mixture of 30 g. of sodium 2-methylsuccinate and 10 g. of sodamide was heated at 150–250° C. for 4.5 hours under 50 atmospheres initial ethylene pressure in a glass liner of the rotating autoclave described in Example I. The maximum pressure was 120 atmospheres. The 42 g. of crystalline product was treated with water, the solution was ether extracted, acidified with hydrochloric acid and again ether extracted. Distillation of the latter extract yielded 5 g. of residual crystalline material, melting at about 90–100° C., which was water-soluble. Evaporation of the acidified aqueous solution to dryness left a crystalline residue which was then extracted with absolute alcohol, evaporation of which left about 3 g. of crystals which on recrystallization from a small amount of water yielded crystals melting at 102–103° C. α-methyl-α-ethylsuccinic acid is reported to melt at 103–104° C.

We claim as our invention:

1. A process for the preparation of a salt of a carboxylic acid which comprises catalytically reacting a mono-olefinic alkene, at a temperature of from about 50° to about 300° C., with a compound selected from the group consisting of alkali metal and alkaline earth metal salts of saturated carboxylic acids having at least one hydrogen atom on an alpha carbon atom, the catalyst in said catalytic reaction being selected from the group consisting of alkali metals, alkali metal hydrides, alkali metal amides, alkali metal alkyls and alkali metal aryls, and hydrolyzing the resultant product.

2. The process of claim 1 further characterized in that said alkene is ethylene.

3. The process of claim 1 further characterized in that said alkene is propylene.

4. The process of claim 1 further characterized in that said catalyst is sodamide.

5. The process of claim 1 further characterized in that the hydrolyzed product is acidified.

6. A process for the preparation of a salt of a higher molecular weight organic acid which comprises catalytically reacting ethylene with sodium acetate in the presence of sodamide as catalyst at a temperature in the range of from about 50° to about 250° C., hydrolyzing the resultant product, and recovering the desired sodium 2,2-diethylbutyrate.

7. A process for the preparation of a salt of a higher molecular weight organic acid which comprises catalytically reacting ethylene with potassium acetate in the presence of potassium amide as catalyst at a temperature in the range of from about 150° to about 250° C., hydrolyzing the resultant product, and recovering the desired potassium 2,2-diethylbutyrate.

8. A process for the preparation of a salt of a higher molecular weight organic acid which comprises catalytically reacting ethylene with sodium propionate in the presence of sodamide as catalyst at a temperature in the range of from about 150° to about 250° C., hydrolyzing the resultant product, and recovering the desired sodium 2,2-diethylpropionate.

9. A process for the preparation of a salt of a higher molecular weight organic acid which comprises catalytically reacting ethylene with potassium acetate in the presence of sodium hydride as catalyst at a temperature in the range of from about 100° to about 225° C., hydrolyzing the resultant product, and recovering the desired potassium 2,2-diethylbutyrate.

10. A process for the preparation of a higher molecular weight organic acid which comprises catalytically reacting ethylene with sodium acetate in the presence of sodamide as catalyst at a temperature in the range of from about 150° to about 250° C., hydrolyzing the resultant product to form sodium 2,2-diethylbutyrate, thereafter acidifying the product, and recovering the desired 2,2-diethylbutyric acid.

11. A process for the preparation of a high molecular weight organic acid which comprises catalytically reacting ethylene with sodium propionate in the presence of sodamide as catalyst at a temperature in the range of from about 150° to about 250° C., hydrolyzing the resultant product to form sodium 2,2-diethylpropionate, thereafter acidifying the last named product, and recovering the desired 2,2-diethylpropionic acid.

12. A process for the preparation of a high molecular weight organic acid which comprises catalytically reacting ethylene with poatssium acetate in the presence of sodium hydride as catalyst at a temperature in the range of from about 150° to about 250° C., hydrolyzing the resultant product to form potassium 2,2-diethylbutyrate, thereafter acidifying the last named product, and recovering the desired 2,2-diethylbutyric acid.

13. A process for the preparation of a salt of a carboxylic acid which comprises catalytically reacting a mono-olefinic alkene, at a temperature of from about 50° to about 300° C., with an alkali metal salt of a saturated carboxylic acid having at least one hydrogen atom on an alpha carbon atom, the catalyst in said catalytic reaction being selected from the group consisting of alkali metals, alkali metal hydrides, alkali metal amides, alkali metal alkyls and alkali metal aryls, and hydrolyzing the resultant product.

References Cited in the file of this patent

UNITED STATES PATENTS 2,850,528    Closson  ---------------- Sept. 2, 1958